(12) United States Patent
Viswanathan et al.

(10) Patent No.: US 10,191,815 B2
(45) Date of Patent: *Jan. 29, 2019

(54) PARALLEL NODE BACKUP FOR CSV

(71) Applicant: EMC IP Holding Company LLC, Hopkinton, MA (US)

(72) Inventors: Sathyamoorthy Viswanathan, Tamil Nadu (IN); Ajith Gopinath, Bangalore (IN); Kishore Kumar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/686,409

(22) Filed: Aug. 25, 2017

(65) Prior Publication Data

US 2017/0351579 A1 Dec. 7, 2017

Related U.S. Application Data

(63) Continuation of application No. 14/752,351, filed on Jun. 26, 2015, now Pat. No. 9,778,994.

(51) Int. Cl.
*G06F 12/02* (2006.01)
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0665* (2013.01); *G06F 3/0689* (2013.01); *G06F 11/1435* (2013.01); *G06F 11/1464* (2013.01); *G06F 2003/0692* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,487,228 B1 | 2/2009 | Preslan | |
| 8,516,210 B2 * | 8/2013 | Buragohain | ........ G06F 11/1446 711/162 |
| 2006/0080362 A1 | 4/2006 | Wagner | |
| 2013/0085999 A1 | 4/2013 | Tung | |
| 2013/0166863 A1 | 6/2013 | Buragohain | |

* cited by examiner

*Primary Examiner* — Charles Rones
*Assistant Examiner* — Ryan Dare
(74) *Attorney, Agent, or Firm* — Van Pelt, Yi & James LLP

(57) ABSTRACT

Techniques to back up a cluster shared volume (CSV) are disclosed. In various embodiments, a snapshot of the cluster shared volume is stored persistently on the cluster shared volume itself. A task to back up a corresponding assigned portion of the snapshot is assigned to each of one or more cluster servers available to participate in backing up the cluster shared volume. The cluster servers have shared access to the snapshot as stored on the cluster shared volume, and each is configured to perform the task assigned to it in parallel with any other cluster servers assigned to back up other portions of the same cluster shared volume snapshot. The respective assigned tasks are monitored to completion.

20 Claims, 6 Drawing Sheets

PARALLEL NODE BACKUP FOR CSV

CROSS REFERENCE TO OTHER APPLICATIONS

This application is a continuation of co-pending U.S. patent application Ser. No. 14/752,351 entitled PARALLEL NODE BACKUP FOR CSV filed Jun. 26, 2015 which is incorporated herein by reference for all purposes.

BACKGROUND OF THE INVENTION

Cluster Shared Volume (CSV) is a cluster technology that provides to a cluster of servers shared access to a shared file system volume that is accessible to all nodes within the cluster, e.g., for read/write operations. CSV volumes have been used to store virtual machine (VM) data on virtual hard disks (VHD) that are accessible to all servers in the cluster.

Backup solutions, such as EMC Networker®, typically utilize all the nodes from a Preferred Server Order List (PSOL) in round robin fashion to back up a CSV volume, but each node will back up only one volume at a time and once the backup of the CSV volume is complete, then the node goes into idle state. If only one CSV volume is present, only the first node in the PSOL is utilized and any remaining node(s) remain(s) idle and never get(s) used.

For example, there may be multiple nodes (n) in the CSV setup and only a single CSV volume that is being managed. A particular node N1 may be the current owner of the CSV volume. When the backup of the CSV is preformed from the virtual or other backup client, the node from which the backup is initiated may be selected from the order list specified in the PSOL to perform the backup. All other nodes in the CSV setup would remain idle.

In another example, there may be multiple nodes (n) and multiple CSV volumes (m) that are present. Node N1 may be managing one/more CSV volumes, node N2 may be managing one/more other CSV volumes, and so on. When the backup is triggered from the virtual client a save operation may be spawned from the nodes selected from the PSOL list in a round robin fashion. When a particular node is done with the backup it goes into an idle state along with other nodes, which don't participate in the backup even when the backup operation is being performed on other nodes in the cluster.

BRIEF DESCRIPTION OF THE DRAWINGS

Various embodiments of the invention are disclosed in the following detailed description and the accompanying drawings.

DETAILED DESCRIPTION

Figure 1:
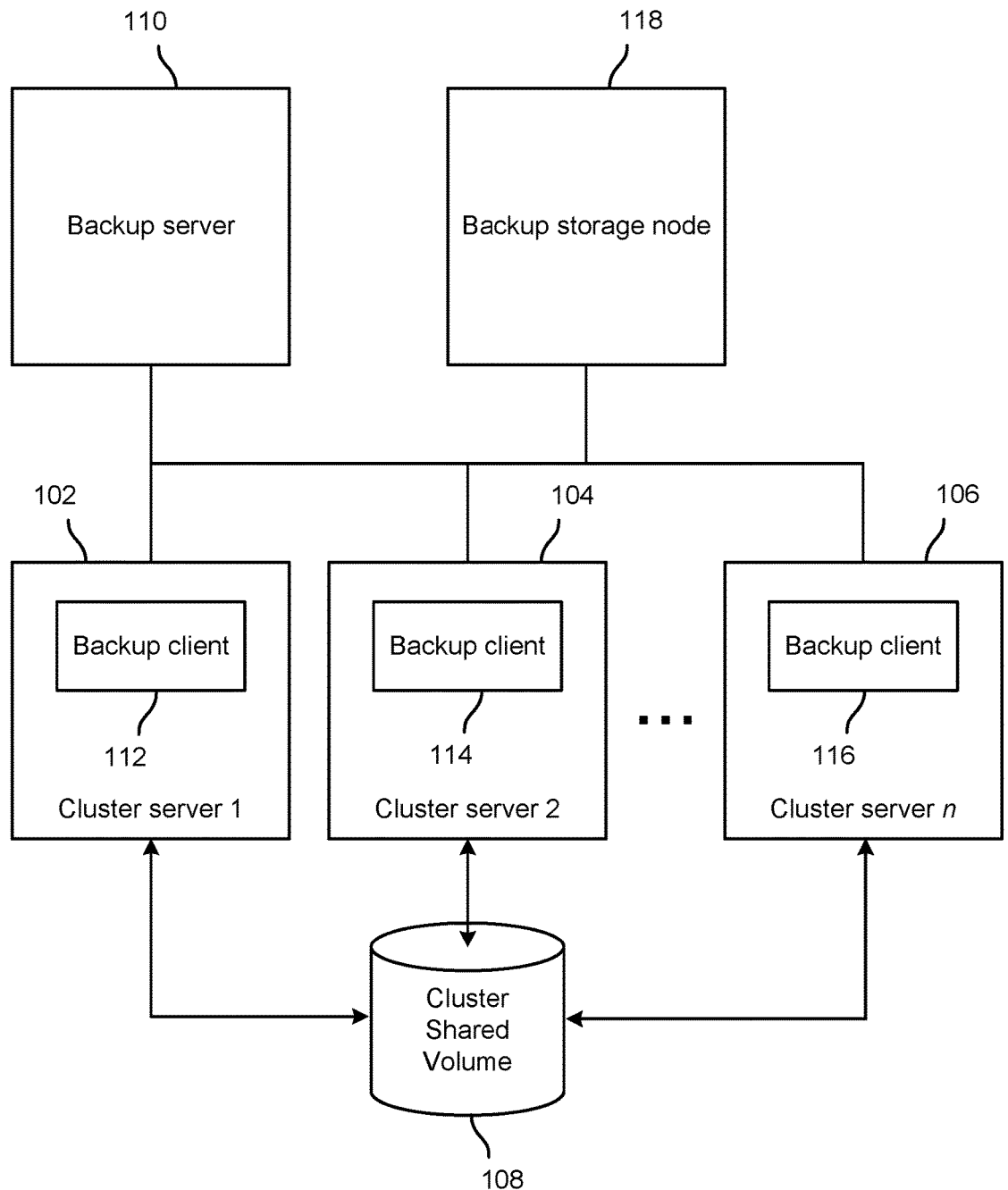
FIG. 1 is a block diagram illustrating an embodiment of a system to back up a cluster shared volume (CSV).

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to utilize all available nodes, e.g., all nodes in the PSOL list, to perform the backup of a CSV volume, e.g., in a Microsoft® Cluster Service (MSCS) CSV configuration, thereby reducing the backup window, are disclosed. In various embodiments, when a backup is triggered from a virtual client, it spawns a save operation in each of the nodes listed in the PSOL. The backup of the CSV Volume is performed in parallel from all of these participating nodes. In various embodiments, the backup window will be reduced and higher throughput is achieved. In various embodiments, a monitor/master process coordinates the backup of the CSV Volume with all the available nodes. This monitor process may be the master emitter save process in some embodiments, if the overhead is minimal, or a new monitor process.

In various embodiments, one or more of the following may be performed:
a. Utilize all the nodes from the PSOL list to perform the backup of one or more CSV volumes.
b. In multiple node multiple CSV volume configurations, the backup of all the CSV volumes may be split across all the nodes in the PSOL.
c. Utilization of the full potential of CSV volumes that allow parallel or simultaneous access (read/write) of the CSV volume by the all the participating node.
d. In multiple node multiple CSV volume configurations, Dynamic Parallel Save Stream (DPSS) technology may be used to achieve better throughput, by configuring one or more nodes to use savestream splitting to simultaneously back up portions of two or more CSV volumes at a time.

In various embodiments, the user can specify which nodes in a cluster are to participate in the backup of a CSV volume. For example, if the user has an 8 node cluster configuration and wishes to enroll only 4 of the nodes to perform the backup, the user can do so by entering the details of only those 4 nodes in the PSOL list.

FIG. 1 is a block diagram illustrating an embodiment of a system to back up a cluster shared volume (CSV). In the example shown, a cluster that includes a plurality of cluster servers 1 through n, represented in FIG. 1 by cluster servers 102, 104, and 106, has shared access to a cluster shared volume (CSV) 108. A backup server 110 is configured to backup up data associated with cluster servers 102, 104, and 106, including in this example data associated with CSV volume 108. The backup server 110, e.g., an EMC® Networker® backup server, is configured to use backup clients 112, 114, and 116 on each cluster server (102, 104, 106) to perform backup operations on and/or using that server. Under control and coordination of backup server 110, the backup clients 112, 114, 116 send backup data, via one or more "saveset" backup streams, to backup storage node 118. In various embodiments, a "saveset" may comprise one or more volumes and/or other defined sets of data that the backup system, including backup server 110 and backup clients 112, 114, 116, may be configured to back up as a set.

In various embodiments, the system of FIG. 1 may include a plurality of "m" CSV volumes associated with the cluster servers 1 to n. Each server in the cluster may have shared access to each CSV volume associated with the cluster. For example, each server in the cluster may have access to read from and write to each of the CSV volumes.

In various embodiments, for each CSV volume such as CSV volume 108 the backup server 110 has configured thereon, e.g., via an administrative interface, a Preferred Server Order List (PSOL), indicating an ordered list of servers included in the cluster (e.g., the cluster comprising servers 102, 104, and 106 of FIG. 1) to be used to perform backup and/or other operations with respect to the cluster. In prior approaches, however, the practical result of using the PSOL to back up a CSV volume resulted in a single server on the list, e.g., the first-listed server, being used to perform the entire backup, while other servers remained idle, as described above.

Techniques to back up CSV volume data in parallel are disclosed. In various embodiments, to back up a CSV volume a snapshot is taken of the CSV volume. The snapshot is stored on the CSV volume itself, making it accessible to servers in the cluster. In various embodiments, the PSOL may be read and used to identify cluster servers to be used to participate in backing up the CSV volume data in parallel, using the snapshot. A master/monitoring process identifies the servers and divides the work up among them. For example, each may be assigned a different set of files within the snapshot, different ranges of offset within the snapshot, etc. Each of the participating servers may then back up its assigned portion of the CSV volume snapshot, in parallel with each other, through their shared access to the CSV volume.

In various embodiments, the participating servers will report completion and/or other status of their work to back up the portion of the CSV volume snapshot that was assigned to them. The master/monitoring process consolidates the status reports and sends a consolidate report to the backup server. For example, if each of the participating cluster servers reports successful completion, the master/monitoring process will send to the backup server a consolidated report indicating that the CSV volume has been backed up successfully.

In various embodiments, the master/monitoring process may be provided by a virtual or other backup client running on one of the cluster servers, e.g., a cluster server that is currently "active" with respect to the CSV volume, a cluster server that comprises a physical disk on which the CSV volume data is stored, a "coordination" node designated to manage the CSV volume, etc. In various embodiments, worker processes are provided by virtual or other backup clients running on cluster servers participating in backing up the CSV volume snapshot in parallel. The respective processes may be provided at least in part using one or more processors (i.e., hardware devices) on each server, executing computer instructions stored in memory or other data storage on such servers.

Figure 2:
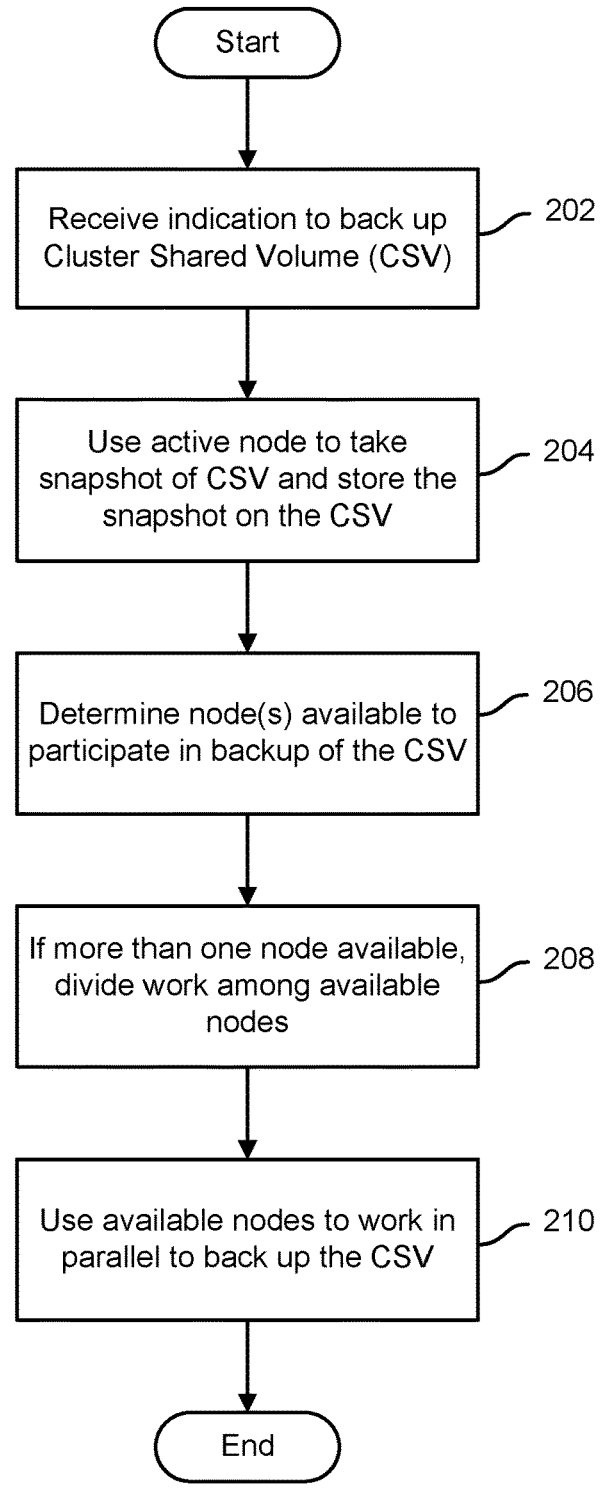
FIG. 2 is a flow chart illustrating an embodiment of a process to back up a CSV volume.

FIG. 2 is a flow chart illustrating an embodiment of a process to back up a CSV volume. In various embodiments, the process of FIG. 2 may be performed by a backup server, such as backup server 110 of FIG. 1. In the example shown, an indication is received to back up a CSV volume (202). For example, a scheduled time to back up the CSV volume may be determined to have arrived. A currently active node among the cluster of nodes (e.g., cluster servers, such as servers 102, 104, 106 of FIG. 1) that is currently active with respect to the CSV volume to be backed up is used to take a snapshot of the CSV volume and to store the snapshot on the CSV volume (204). In various embodiments, a snapshot service associated with the CSV volume and/or servers in the cluster may be used to take and store the snapshot. In various embodiments, storing the snapshot on the CSV results in the snapshot being available to be read by any server in the cluster.

Nodes available to participate in backing up the CSV volume are identified (206). For example, a PSOL or other configured list of servers available to be used to back up the CSV volume may be read. If there is no PSOL or other list, or if no servers are listed and/or no listed server is currently online and otherwise available to participate in backing up the CSV volume, then the node (cluster server) that is currently active with respect to the CSV may be used. If more than one node has been determined to be available to participate (206), the work of backing up the CSV volume is divide among the nodes available to participate (208). For example, if four nodes are listed in the PSOL and all four nodes are determined to be available, in some embodiments each may be assigned approximately 25% of the work. The available nodes are used to back up the CSV volume in parallel (210). For example, each node may be sent a task that identifies a portion of the CSV volume snapshot that should be read and backed up by that node. In various embodiments, once all participating nodes have reported successful completion of the portion of the work assigned to that node, a consolidated completion and/or other status report may be sent to the backup server.

Figure 3:
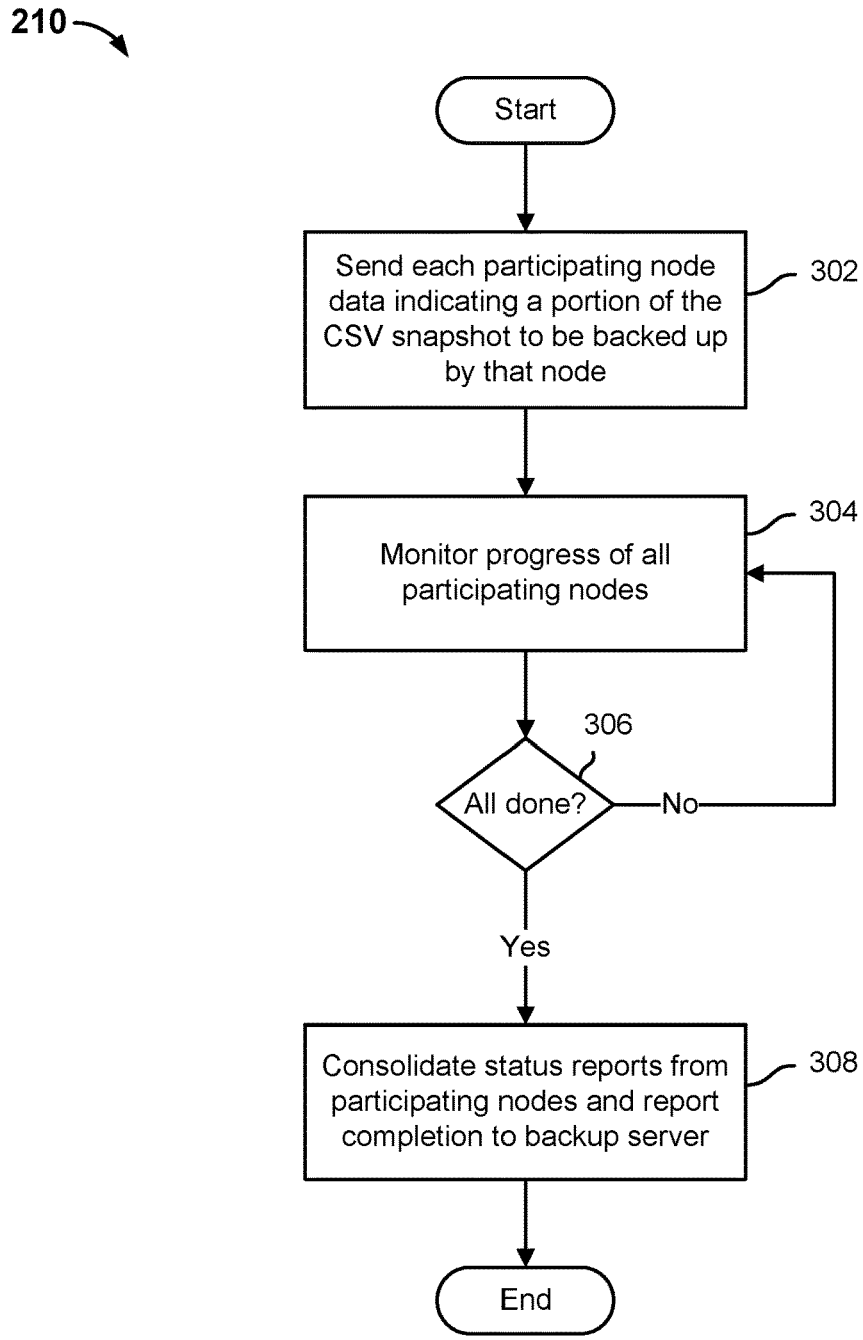
FIG. 3 is a flow chart illustrating an embodiment of a process to coordinate back up of a CSV volume.

FIG. 3 is a flow chart illustrating an embodiment of a process to coordinate back up of a CSV volume. In various embodiments, the process of FIG. 3 may be performed by a backup server, such as backup server 110 of FIG. 1. In some embodiments, the process of FIG. 3 may be performed by a master or monitoring process associated with a virtual backup client running on a cluster server, such as backup clients 112, 114, and 116 of FIG. 1. In some embodiments, step 210 of the process of FIG. 2 may be implemented at least in part using the process of FIG. 3. In the example shown, each cluster node (e.g., cluster server) participating in backing up the CSV volume is sent data indicating a portion of the CSV volume snapshot that is to be backed up by that node (302). For example, a list of files, range of offset, etc., may be sent to each node. The progress of all participating nodes is monitored (304). For example, an in memory or other data structure may be used to keep track of which nodes are participating and for each the portion of the CSV volume snapshot that is to be backed up by that node, and status data, e.g., indicating whether the node has been sent an indication to begin backing up the portion of the CSV volume snapshot that has been assigned to it, has completed backing up its assigned portion and reported completion, etc. Once all participating nodes have reported completion (306), a consolidated status report is prepared and sent to the backup server (308).

Figure 4:
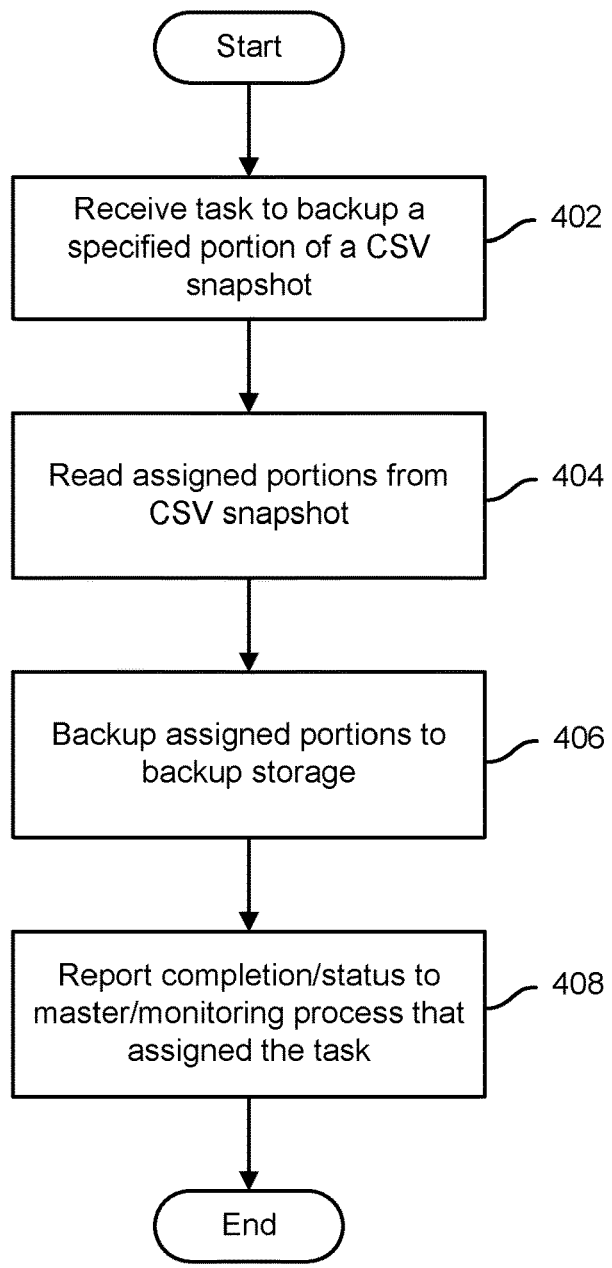
FIG. 4 is a flow chart illustrating an embodiment of a process to participate in backing up of a CSV volume.

FIG. 4 is a flow chart illustrating an embodiment of a process to participate in backing up of a CSV volume. In various embodiments, each cluster node identified to participate in backing up a CSV volume, e.g., cluster servers 102, 104, and 106 of FIG. 1, may perform the process of FIG. 4. In the example shown, a task to back up a specified portion of a CSV volume, e.g., a specified part of a CSV volume snapshot, is received (402). The specified portion of the CSV volume snapshot as stored on the CSV is read (404) and backed up (406), e.g., by streaming or otherwise transmitting the data to be stored on a backup storage node. In the example shown in FIG. 1, for instance, backup client 112 of cluster server 102 may receive a task to back up a specified portion of a CSV volume snapshot stored on CSV volume 108. The backup client 112 may access the snapshot stored on CSV volume 108 to read the portions assigned to cluster server 102 to back up, and to provide the data in a backup stream sent to backup storage node 118, in this example. Once a participating node has completed its back up of the portion of the CSV volume snapshot which it has been assigned to backup, the participating node sends a completion (or other status, if not completed) report to a master and/or other monitoring process that assigned it the task (408), after which the process ends.

In various embodiments, each of a plurality of cluster servers assigned to participate in the backup of a CSV volume may perform the process of FIG. 4 in parallel, each with respect to a portion of the CSV volume snapshot that was assigned to it.

Figure 5:
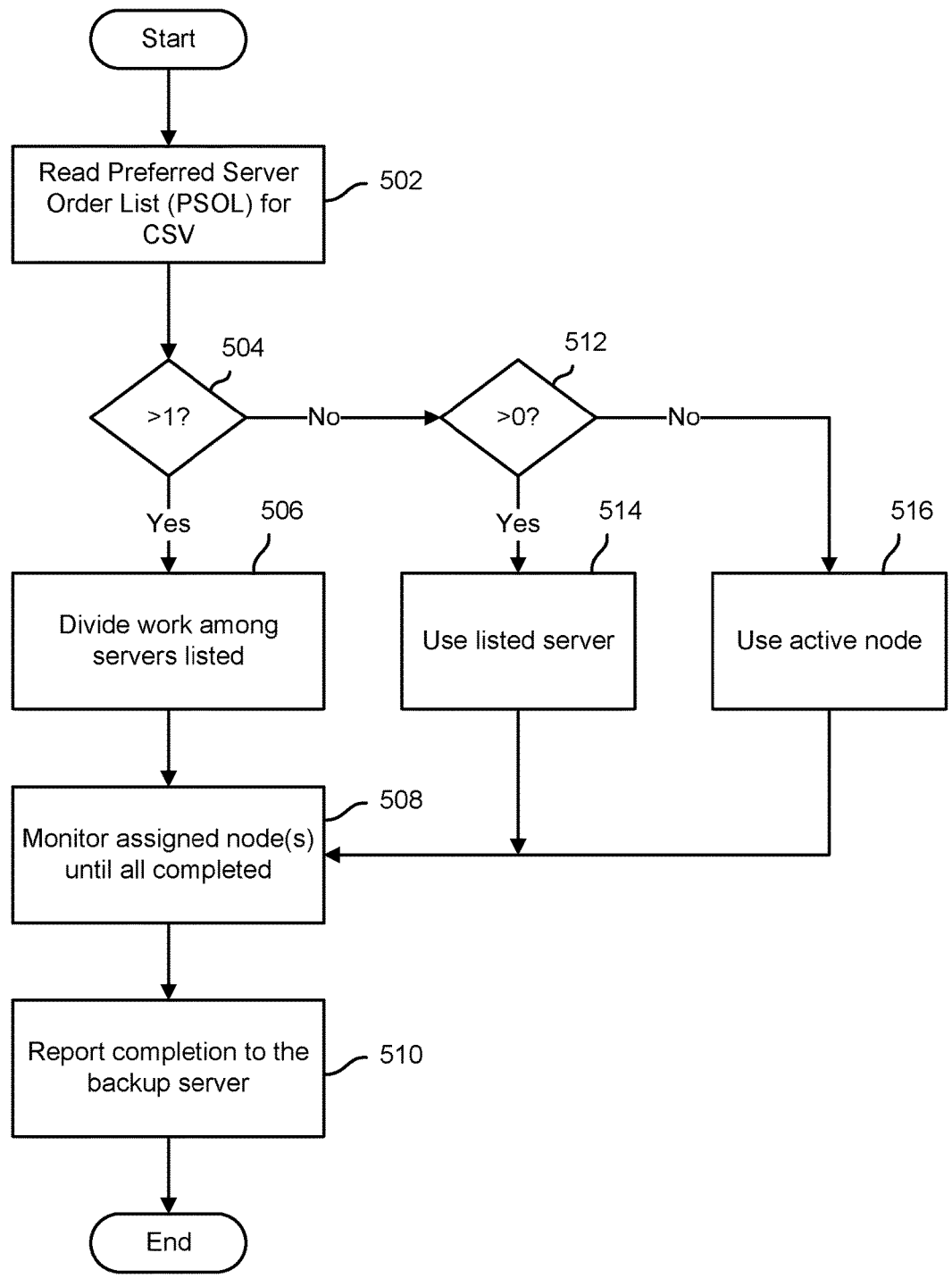
FIG. 5 is a flow chart illustrating an embodiment of a process to back up a CSV volume.

FIG. 5 is a flow chart illustrating an embodiment of a process to back up a CSV volume. In various embodiments, the process of FIG. 5 may be performed by one or both of a backup server, such as server 110 of FIG. 1, and a virtual or other backup client, such as backup clients 112, 114, 116 of FIG. 1. In various embodiments, a master/monitoring process may be spawned to coordinate backup of a CSV volume by multiple cluster nodes working in parallel, as disclosed herein, e.g., via the process of FIG. 5. In the example shown, a preferred server order list (PSOL) or other list of resources available to be used to back up a CSV volume is read (502). If there are more than one server listed (504), the work of backing up the CSV volume is divided among the servers listed and each is tasked with backing up the portion that has been assigned to it (506). All nodes assigned to participate are monitored until all have reported completion (508), after which a consolidated report of completion (or other status, if not completed) is sent to the backup server (510). If the PSOL or other list does not list more than one server (504) and instead lists a single server (512), the listed server is used to back up the CSV volume (514). If no server is listed (512), or in some embodiments if no listed server is available, then the cluster node (server) that is currently active with respect to the CSV volume to be backed up is used to perform the backup (516).

While in various examples described herein all available nodes, e.g., all nodes listed in a PSOL or other listing, are described as participating in backing up a CSV volume, in some embodiments fewer than all available nodes may be used. For example, a prescribed number or maximum number of nodes fewer than all nodes available may be used. Also, in various examples the workload is described as being distributed relatively evenly across participating nodes. In some embodiments, the workload may be distributed unevenly. For example, load balancing principle or algorithms may be applied to determine how much of the backup should be performed by each participating node. Factors such as other backup or other workload of each node, resources and capabilities of each node, etc., may be taken into consideration.

In some embodiments, further parallelism may be achieved and leveraged by using sending CSV volume data in two or more data streams from a given participating node to one or more destination backup storage systems in parallel. For example, each of at least a subset of node configured to participate in backing up a CSV volume in parallel as disclosed herein may use two or more data streams to send data from that node to backup storage.

Figure 6:
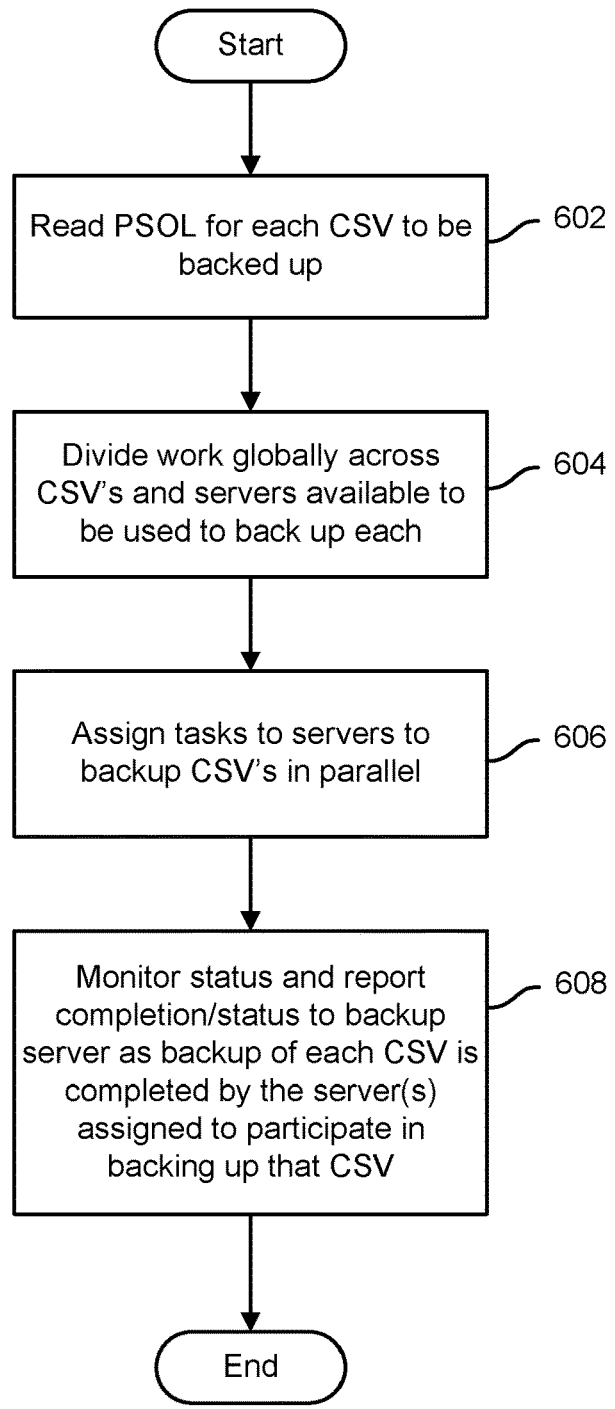
FIG. 6 is a flow chart illustrating an embodiment of a process to back up multiple CSV volumes.

FIG. 6 is a flow chart illustrating an embodiment of a process to back up multiple CSV volumes. In various embodiments, the process of FIG. 6 may be performed by a backup server, such as backup server 110 of FIG. 1. In various embodiments, the process of FIG. 6 may be used to back up multiple CSV volumes concurrently. For example, a cluster of n nodes (cluster servers) may have shared access to m different CSV volumes. In the example shown, for each CSV to be backed up a PSOL or other list is read to determine which cluster nodes have been designated to participate in the backup of that CSV volume (602). The work of backing up the multiple CSV volumes is divided up globally across CSV volumes and cluster servers, taking into consideration which servers are available to back up which CSV volumes. For example, if there are three cluster servers A, B, and C and two CSV volumes X and Y; all three servers are listed in the PSOL for CSV volume X, but only A and B are listed for Y; and volume X and volume Y each have about 300 GB of data to be backed up; then cluster server C, which can only help with CSV volume X, may be assigned a greater than even share of the work to back up volume X, to balance the work among all three with respect to the total workload. For example, A and B may each be assigned to back up half of volume Y (e.g., about 150 GB) and about 50 GB of volume X, leaving the remaining 200 GB of volume X to be backed up by cluster server C, so that each would end up with roughly the same workload. Tasks are assigned to participating cluster servers, each to back up its assigned portion of the CSV volume(s) assigned to it (606). The status of tasks assigned to participating cluster nodes is monitored, and a consolidated completion/status report is sent to the backup server for each CSV volume once all of the cluster servers assigned to participate in the backup of that CSV volume have reported (608).

In various embodiments, performing parallel backup of CSV volumes as disclosed herein may reduce (shorten) the backup window and enable higher throughput to be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data stored on a cluster shared volume (CSV), comprising:

storing on the cluster shared volume a snapshot of the cluster shared volume;

assigning to each of one or more cluster servers available to participate in backing up the cluster shared volume a task to back up a corresponding assigned portion of the snapshot to a backup storage node separate from the cluster shared volume and the one or more cluster servers, wherein the cluster shared volume is separate from the one or more cluster servers; and monitoring the respective assigned tasks to completion, wherein the one or more cluster servers have shared access to the snapshot as stored on the cluster shared volume and each is configured to perform the task assigned to it in parallel with any other cluster servers assigned to back up other portions of the same cluster shared volume snapshot.

2. The method of claim 1, further comprising causing the snapshot of the cluster shared volume to be taken.

3. The method of claim 1, further comprising determining which of the one or more cluster servers are available to participate in backing up the cluster shared volume.

4. The method of claim 1, further comprising determining for each cluster server determined to be available to participate in backing up the cluster shared volume said corresponding assigned portion of the snapshot.

5. The method of claim 4, wherein said corresponding assigned portion of the snapshot is determined by assigning to each participating cluster server an equal share of the work to back up the cluster shared volume.

6. The method of claim 4, wherein said corresponding assigned portion of the snapshot is determined at least in part by balancing a workload globally across multiple cluster servers with respect to backing up a plurality of cluster shared volumes.

7. The method of claim 1, further comprising:
receiving status reports from the participating cluster servers; and
consolidating the status reports into a consolidated report, wherein the status reports indicates completion of the task assigned to that cluster server.

8. The method of claim 7, further comprising sending the consolidated report to a backup server.

9. A system to back up data stored on a cluster shared volume (CSV), comprising:
a communication interface; and
a processor coupled to the communication interface and configured to:
store on the cluster shared volume a snapshot of the cluster shared volume;
assign to each of one or more cluster servers available to participate in backing up the cluster shared volume, via communications sent via the communication interface, a task to back up a corresponding assigned portion of the snapshot to a backup storage node separate from the cluster shared volume and the one or more cluster servers, wherein the cluster shared volume is separate from the one or more cluster servers; and
monitor the respective assigned tasks to completion, wherein the one or more cluster servers have shared access to the snapshot as stored on the cluster shared volume and each is configured to perform the task assigned to it in parallel with any other cluster servers assigned to back up other portions of the same cluster shared volume snapshot.

10. The system of claim 9, wherein the processor is further configured to cause the snapshot of the cluster shared volume to be taken.

11. The system of claim 9, wherein the processor is further configured to determine which cluster servers are available to participate in backing up the cluster shared volume.

12. The system of claim 9, the processor is further configured to determine for each cluster server determined to be available to participate in backing up the cluster shared volume said corresponding assigned portion of the snapshot.

13. The system of claim 12, wherein said corresponding assigned portion of the snapshot is determined by assigning to each participating cluster server an equal share of the work to back up the cluster shared volume.

14. The system of claim 12, wherein said corresponding assigned portion of the snapshot is determined at least in part by balancing a workload globally across multiple cluster servers with respect to backing up a plurality of cluster shared volumes.

15. The system of claim 9, wherein the processor is further configured to:
receive status reports from the participating cluster servers; and
consolidate status reports into a consolidated report, wherein the status reports indicates completion of the task assigned to that cluster server.

16. The system of claim 9, wherein the processor is further configured to send the consolidated report to a backup server.

17. A computer program product to back up data stored on a cluster shared volume (CSV), the computer program product being embodied in a non-transitory computer readable medium and comprising computer instructions for:
storing on the cluster shared volume a snapshot of the cluster shared volume;
assigning to each of one or more cluster servers available to participate in backing up the cluster shared volume a task to back up a corresponding assigned portion of the snapshot to a backup storage node separate from the cluster shared volume and the one or more cluster servers, wherein the cluster shared volume is separate from the one or more cluster servers; and
monitoring the respective assigned tasks to completion, wherein the one or more cluster servers have shared access to the snapshot as stored on the cluster shared volume and each is configured to perform the task assigned to it in parallel with any other cluster servers assigned to back up other portions of the same cluster shared volume snapshot.

18. The computer program product of claim 17, further comprising causing the snapshot of the cluster shared volume to be taken.

19. The computer program product of claim 17, further comprising determining which cluster servers are available to participate in backing up the cluster shared volume.

20. The computer program product of claim 17, further comprising determining for each cluster server determined to be available to participate in backing up the cluster shared volume said corresponding assigned portion of the snapshot.

* * * * *